United States Patent [19]

Quis et al.

[11] Patent Number: 4,558,084

[45] Date of Patent: Dec. 10, 1985

[54] PLASTISOL COMPRISING A COPOLYMER OF METHYL METHACRYLATE AND ITACONIC OR ITS ANHYDRIDE

[75] Inventors: Peter Quis, Darmstadt-Neu-Kranichstein; Werner Siol, Pfungstadt; Joachim Buechse, Trebur; Hubert Rauch, Weiterstadt, all of Fed. Rep. of Germany

[73] Assignee: Röhm GmbH, Darmstadt, Fed. Rep. of Germany

[21] Appl. No.: 420,040

[22] Filed: Sep. 20, 1982

[30] Foreign Application Priority Data

Oct. 1, 1981 [DE] Fed. Rep. of Germany ....... 3139090

[51] Int. Cl.$^4$ ...................... C08L 33/12; C08L 35/00; C08J 3/06; C09D 3/80
[52] U.S. Cl. .................................... 524/294; 428/457; 524/285; 524/512; 524/548; 524/549; 524/555; 524/559
[58] Field of Search ............... 524/294, 559, 549, 512; 525/163; 428/457

[56] References Cited

U.S. PATENT DOCUMENTS

| 4,077,935 | 3/1978 | Wzolek | 524/559 |
| 4,210,567 | 7/1980 | Kösters | 524/561 |
| 4,342,858 | 8/1982 | Herman et al. | 526/271 |

FOREIGN PATENT DOCUMENTS

| 2454235 | 5/1976 | Fed. Rep. of Germany . |
| 2529732 | 1/1977 | Fed. Rep. of Germany . |
| 2812015 | 3/1980 | Fed. Rep. of Germany . |
| 55-25455 | 2/1980 | Japan | 524/559 |
| 1516510 | 7/1978 | United Kingdom . |
| 1598580 | 9/1981 | United Kingdom . |

OTHER PUBLICATIONS

Stille, *Introduction to Polymer Chemistry*, (pp. 34 to 40); John Wiley & Sons, Inc.; N.Y., 1962.
Nakajima, "Fraction of Linear Polyethylene with Gel Permeation Chromatography", Polymer Moleculer Weight Methods, A.C.S., Advances in Chemistry Series, vol. 125, American Chemical Society, pp. 98 to 107, Washington, D.C. (1973).
Ullmann's Encyclopaedie der Technischen Chemie, 3rd Ed., vol. 18, Urban and Schwarzenberg, Munich (1967), p. 564.
"Methoden der Organischen Chemie", Houben–Weyl, 4th Edn., vol. XIV/1, Georg Thieme Verlag, Stuttgart, pp. 81–85.
Product Literature of Ulmer Fuellstoff Vertrieb GmbH, Ulm, re "Mikro–Calcilin OF" and Ulmer Weiss BS.

*Primary Examiner*—C. Warren Ivy
*Attorney, Agent, or Firm*—Curtis, Morris & Safford

[57] ABSTRACT

What are disclosed are plastisols of copolymers of methyl methacrylate with from 0.1 to 10 weight percent of itaconic acid or of itaconic acid anhydride, which copolymers have a glass transition temperature above 50° C., a degree of polymerization higher than 400 and an average particle size ranging from 0.1 to 500 microns and contain, per 100 parts by weight of the copolymer, from 100 to 1000 parts by weight of an organic plasticizer compatible with the copolymer, and optional fillers and further conventional additives.

5 Claims, No Drawings

PLASTISOL COMPRISING A COPOLYMER OF METHYL METHACRYLATE AND ITACONIC OR ITS ANHYDRIDE

The present invention relates to plastisols comprising copolymers of methyl methacrylate, which plastisols exhibit, among other things, improved adhesion to electrophoretically primed sheet metal.

Acrylate-based plastisols are known. German published examined patent application DE-AS No. 25 29 732 claims plastisols formed of 100 parts by weight of an acrylate homopolymer and/or acrylate copolymer with methacrylic acid esters of aliphatic $C_2$ to $C_{10}$ alcohols, acrylic acid esters of aliphatic $C_1$ to $C_{10}$ alcohols, styrene and/or alpha-methylstyrene, the polymer and/or copolymer having an average particle size ranging from 0.1 to 500 microns, a glass transition temperature Tg above 35° C., and a degree of polymerization higher than 400. The plastisols comprise from 30 to 1000 parts by weight of an organic plasticizer which is compatible with the homo- and/or copolymer and will impart to the plastisol a viscosity index $V_{8/o}$ of less than 3.0. The plastisols optionally may contain up to 700 parts by weight of inert fillers and optional further conventional additives. The polymer may further incorporate a minor amount of acrylate and/or methacrylate monomers with hydroxyl, epoxy, amino or free carboxyl groups.

Said German patent application further recommends that small amounts of certain heterocyclic compounds be incorporated during polymerization for improvement of the adhesive properties. N-vinyl imidazole is said to be particularly effective. According to that application, adhesion of the plastiols can be improved further by adding further crosslinking agents which will react with the heterocyclic group of the comonomer incorporated during polymerization. Epoxy resins, for example, have proved suited for the purpose. Polybasic carboxylic acids such as benzenetricarboxylic acid, adipic acid, maleic acid and itaconic acid have also been found to be suitable crosslinking agents that will bring about a further improvement of the adhesive properties.

The examples make it clear that the presence of N-vinyl imidazole in the polymers used is absolutely necessary in order to secure adequate adhesion of the plastisols to electrophoretically primed sheet metal. It is shown that without this adhesion promoter incorporated in the polymer no tensile strength can be obtained with methyl methacrylate homopolymers or methyl methacrylate/butyl methacrylate copolymers. The aforementioned polybasic carboxylic acids can be added as crosslinking agents to a finished plastisol whose polymer component contains N-vinyl imidazole as an adhesion promoter, and this addition will result in a further substantial improvement in adhesion.

It has been found that the prior art plastisols do not fully meet practical requirements. For one thing, their adhesion to sheet metal, which is a basic requirement especially in automotive applications, still leaves much to be desired. Moreover, the production on a commercial scale of the polymers which are particularly preferred in the German patent application cited poses certain difficulties which probably have to do with the relatively low tendency of N-vinyl imidazole to polymerize.

Thus there has been a need to develop plastisols which possess optimum adhesive properties and whose polymer component is obtainable without undue technical complications, and which can be prepared and applied with the aid of the usual plasticizers in a simple and controllable manner.

The primary concern necessarily was adhesion to electrophoretically primed sheet metal, which is finding growing use in the automotive industry. Other considerations were adhesions to steel and aluminum generally, whether greased, degreased, phosphated, or primed, and to fabrics, etc., with due regard to the retention of the other properties of plastisols, such as pot life, mechanical properties, flow properties, ability to gel, plasticizer absorption, etc.

It has now been found that the problem outlined above can be substantially solved by using as the polymer component of the plastisol a copolymer of methyl methacrylate with up to 10 weight percent of itaconic acid or of itaconic acid anhydride.

The content of itaconic acid or its anhydride in the polymer will generally range from 0.1 to 10 weight percent, preferably from 0.5 to 7.5 weight percent, more particularly from 1 to 5 weight percent, and will especially be $2\pm1$ weight percent. Optionally the polymer component of the plastisols in accordance with the invention may further contain nitrogen-bearing polymerizable units, for example a polymerizable base such as vinylpyridine, N,N-dimethylaminopropyl methacrylate, 3-dimethylamino-2,2-dimethylpropyl-1-acrylate or methacrylate, vinyl imidazole, or polymerizable amides in an amount ranging from 0.05 to 3 weight percent, and more particularly from 0.1 to 2 weight percent, as comonomers.

The polymers may be produced conventionally, for example, by emulsion or suspension polymerization. When emulsion polymerization is chosen, the continuous emulsion addition or continuous monomer addition method may be advantageously employed, a portion of the water and the total amount or portions of the initiator and of the emulsifier being charged first. With these methods, the particle size can be controlled to advantage by the amount of emulsifier charged. All anionic and nonionic surfactants are particularly well suited for use as emulsifiers. As a rule, the amount of emulsifier used will not exceed 1 weight percent, based on the polymer.

In addition to the compounds commonly used in emulsion polymerization, for example peroxy compounds such as hydrogen peroxide or ammonium peroxydisulfate (APS), suitable initiators are redox systems such as bisulfite-APS-iron, as well as azo initiators. The amount of initiator will generally range from 0.005 to 0.5 weight percent, based on the polymer.

The polymerization temperature depends, within certain limits, on the initiators. When APS is used, the temperature preferably ranges from 60° to 90° C. When redox systems are used, the polymerization may be conducted at lower temperatures, for example 30° C. In addition to continuous-flow polymerization, batch polymerization may be employed. The total amount or a portion of the monomers with all auxiliary agents is then charged first and the polymerization started with the aid of redox initiators. The monomer/water ratio must be adjusted with respect to the heat of reaction being liberated. As a rule, no difficulties will be encountered when a 50% emulsion is prepared by first emulsifying half of the monomers and of the auxiliary agents in the total amount of the water, starting the polymerization at room temperature, and, on completion of the reaction, cooling the batch and adding the other half of the monomers along with the auxiliary agents.

The polymers may be obtained in solid form by conventional methods, by spray drying, freeze drying, or precipitation. In some cases, it may be advantageous to agglomerate the individual latex particles into larger units (partial formation of glassiness) during drying. A range of 5 to 200 microns will serve as a guide for the size of the agglomerated units.

The polymers to be used in accordance with the invention may also be produced by the bead (suspension) polymerization process. The usual dispersing agents and the usual vessels (pressureless or pressure vessels) can then be used. (See Houben-Weyl, 4th Ed., Vol. XIV, p. 406 et seq. and p. 1053 et seq., Georg-Thieme-Verlag.) For reasons of better initial swelling, bead polymers with a particle diameter well under 100 microns are preferred.

The polymers which are suited for use in accordance with the invention preferably meet the criteria set forth in German published unexamined patent application DE-OS No. 24 54 235 and DE-OS No. 25 29 732 with respect to particle size and average degree of polymerization, namely their average particle size is between 0.1 and 500 microns and they have a degree of polymerization greater than 400 based on a weight average molecular weight determination. The glass transition temperature is preferably above 50° C. Conventional plasticizers such as those listed in said patent applications may be used. Plasticizers comprising esters of phthalic acid, as well as polymeric plasticizers, are particularly well suited for use. The plasticizer component of the plastisol will usually have from 1 to 10 times, and preferably from 1 to 3 times, the weight of the polymer. The plastisol may further contain the usual additives, such as inorganic fillers, flow promoters, thixotropic agents, pigments, and external adhesion promoters.

In the plastisols in accordance with the invention, plasticizers or plasticizer combinations are preferably used which, during a storage time of the plastisols prepared therewith of over three weeks at a temperature of 30° C., result in a viscosity increase of less than ten times, and more particularly of less than five times, the initial viscosity. Suitable plasticizers are the phthalate esters commonly used for the purpose, such as dimethylcyclohexyl phthalate, and particularly benzyloctyl phthalate, as well as polymeric plasticizers, for example flexible urea resins, e.g. "PLASTIGEN G", a cyclic reaction product of urea-formaldehyde etherified with butanol which is commercially available from BASF, or "URESIN B", a carbamic acid-ester resin of butylurethane and formaldehyde commercially available from Hoechst AG, polyester plasticizers, etc.

The plastisols may be prepared conventionally, for example as follows: The liquid components (plasticizers) are mixed first, then the powered polymer is stirred into the liquid phase by means of an agitator, the fillers then being added in the same way. For better homogenization, the whole batch is then passed through a roller mill. Primed surfaces can then also be coated conventionally with the plastisols of the invention. For baking the plastisols, temperatures in the range between 100° C. and 200° C. are adequate. Baking times usually are between 5 and 30 minutes depending on baking temperature. The adhesion of such plastisol coatings applied to electrophoretically primed sheet metal is usually better than the cohesion of the film.

A better understanding of the present invention and of its many advantages will be had by referring to the following specific Examples, given by way of illustration.

EXAMPLE 1

Preparation of a polymer dispersion

In a Witt jar equipped with reflux condenser, agitator, and feed vessel, 0.35 g of ammonium peroxydisulfate and 0.70 g of the sodium salt of a $C_{15}$ paraffin sulfate are dissolved at 80° C. in 1400 g of distilled water. An emulsion previously prepared from 3430 g of methyl methacrylate, 70 g of itaconic acid, 16.8 g of the above emulsifier, 1.05 g of the above initiator, and 2119 of distilled water are added dropwise at 80° C. with stirring over a period of 4 hours. At the end of this dropwise addition, 0.35 g of ammonium peroxydisulfate are added and the batch is held at 80° C. for 2 hours. After cooling to room temperature, the batch is filtered through a fine-meshed stainless-steel woven-wire screen. The dispersion has a solids content of about 50%. Glass transition temperature=102° C.; average particle size: 270 nm; $\eta$sp./c (measured in $CHCl_3$)=322 $cm^3 \times g^{-1}$ (20° C.).

EXAMPLE 2

Drying of polymer dispersion

The dispersion is fed concurrently with air at 150° C. to a spray-drying system equipped with a high-speed (18,000 rpm) centrifugal disk atomizer. The volume ratio dispersion/air is adjusted so that the spray-dried material leaves the system at an air exit temperature of about 65° C. in the form of a dry, finely divided, white to translucent powder containing no glassy components. The particle size, on the average, is in the range of 60 micron $\mu$.

The powder has a $\eta$sp/c, measured in $CHCl_3$, of 322 ($cm^3g^{-1}$, 20° C., corresponding to an average molecular weight of about $1.10^6$).

EXAMPLE 3

Preparation of plastisol and use thereof 20 parts of the acrylic polymer prepared in accordance with Example 1, 30 parts of benzyloctyl phthalate ("Santicizer 261" of Monsanto), 35 parts of chalk having an average particle size of 3.9 microns ("Ulmer Weiss BS", product of Ulmer Füllstoff-Werke), and 15 parts of "Microcalcilin OFB" (chalk) having an average particle size of 2.8 microns are passed once through a roller mill at room temperature. A filled plastisol is obtained in this way, the viscosity of which at 30° C. increased over a period of 3 weeks by a factor of 3.5. Applied in the usual way to electrophoretically primed metal sheets and baked on at temperatures of 130° C. for 20 minutes or 180° C. for 10 minutes, it gives films of good adhesion. Tensile shear testing always produces breaks in the film.

EXAMPLE 4

Preparation of a polymer dispersion

In a Witt jar equipped with reflux condenser, agitator, and feed vessel, 0.1 g of ammonium peroxydisulfate and 0.6 g of a technically used emulsifier (a 50 percent aqueous solution of the sodium sulfate of the reaction product of tri-isobutylphenol with 7 mols of ethylenoxide) are dissolved at 80° C. in 1000 g of distilled water.

A mixture prepared from 980 g of methyl methacrylate, 20 g of itaconic acid anhydride, and 9.6 g of the above emulsifier is added dropwise at 80° C. with stirring over a period of 4 hours. The batch is held at 80° C. for 2 hours. After cooling to room temperature, the batch is filtered through a fine-meshed stainless-steel woven-wire screen. The dispersion has a solids content of about 50%. Glass transition temperature=103° C., average particle size=160 nm; $\eta sp/c$ (measured in $CHCl_3$) of=320 $cm^3 \times g^{-1}$ (20° C.); corresponding to an average molecular weight of about $1 \cdot 10^6$.

EXAMPLE 5

Drying of polymer dispersion

The dispersion of Example 4 is dried as described in Example 2. One obtains a dry, finely divided, white to translucent powder containing no glassy components, average particle size is 60µ. The powder has a $\eta sp/c$, measured in $CHCl_3$, of 320 $cm^3 \times g^{-1}$, (20° C.).

EXAMPLE 6

Preparation of plastisol and use thereof 20 parts of the acrylic polymer prepared in accordance with Example 4, 30 parts of benzyloctyl phthalate ("Santicizer 261" of Monsanto), 10 parts of di-(methylcyclohexyl)phthalate, 35 parts of chalk having an average particle size of 3.9 microns ("Ulmer Weiss BS", product of Ulmer Füllstoff-Werke), and 15 parts of "Microcalcilin OFB" (chalk) having an average particle size of 2.8 microns are passed once through a roller mill at room temperature. A filled plastisol is obtained in this way, the viscosity of which at 30° C. increased over a period of 3 weeks by a factor of 3.5. Applied in the usual way to electrophoretically primed metal sheets and baked on at a temperature of 180° C. for 10 minutes, it gives films of good adhesion.

What is claimed is:

1. A plastisol comprising a copolymer consisting of methyl methacrylate and from 0.1 to 10 percent by weight of said copolymer of itaconic acid or of itaconic acid anhydride, said copolymer having a glass transition temperature above 50° C., a degree of polymerization greater than 400, and an average particle size between 0.1 and 500 microns, said plastisol further comprising from 100 parts to 1000 parts by weight, per 100 parts by weight of said copolymer, of an organic plasticizer compatible with said copolymer.

2. A plastisol as in claim 1 wherein said copolymer contains from 0.5 to 7.5 percent by weight of itaconic acid or itaconic acid anhydride.

3. A plastisol as in claim 1 wherein said plasticizer is benzyloctyl phthalate.

4. A plastisol as in claim 1 which additionally comprises up to 700 parts by weight of an inert filler.

5. The method of coating electrophoretically primed sheet metal which comprises applying thereto a plastisol as in claim 1 and baking at an elevated temperature.

* * * * *